Sept. 28, 1965  D. G. SIEFERT  3,209,248
MEANS FOR CALIBRATING THE SENSITIVITY OF RESPONSE
OF A CONDITION-RESPONSIVE CIRCUIT COMPONENT
Filed Aug. 6, 1962
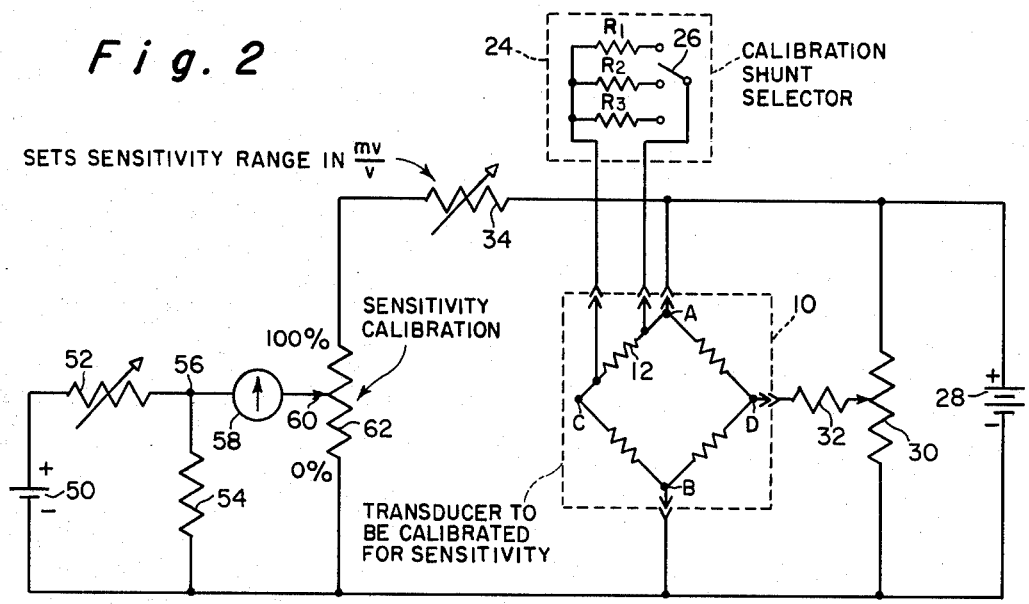
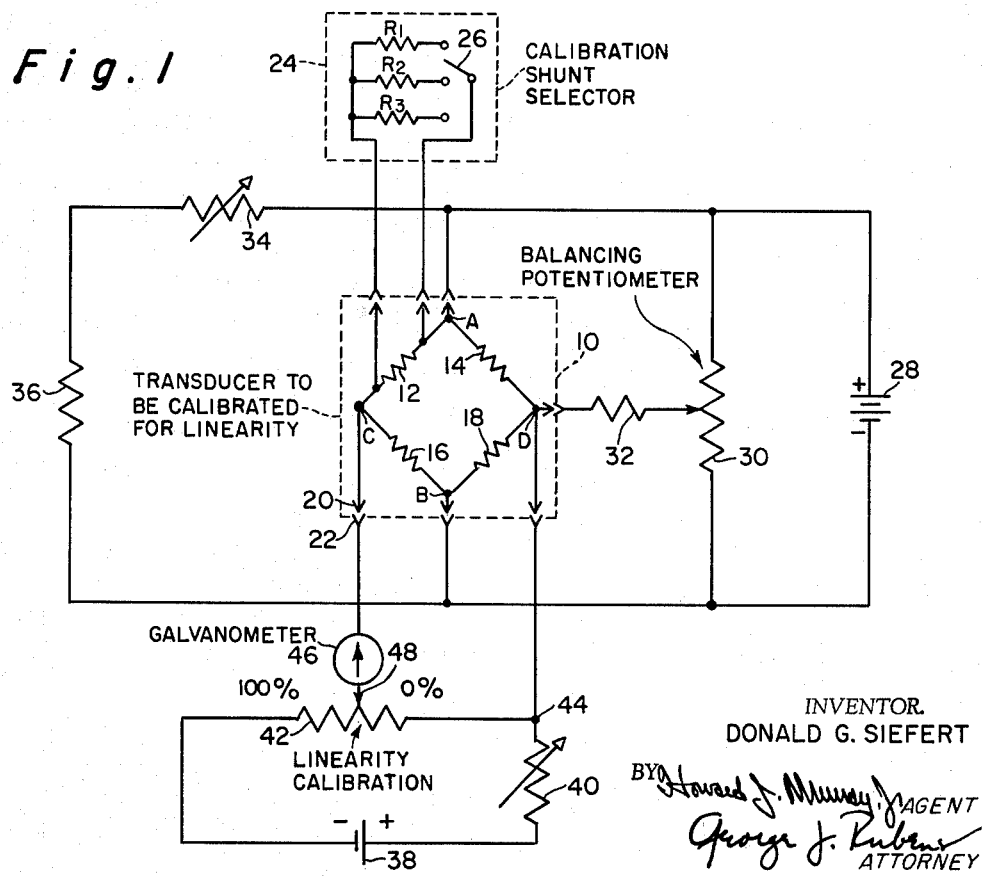
INVENTOR.
DONALD G. SIEFERT

United States Patent Office 3,209,248
Patented Sept. 28, 1965

3,209,248
MEANS FOR CALIBRATING THE SENSITIVITY OF RESPONSE OF A CONDITION-RESPONSIVE CIRCUIT COMPONENT
Donald G. Siefert, Hayward, Calif., assignor, by mesne assignments, to the United States of America as represented by the Secretary of the Navy
Filed Aug. 6, 1962, Ser. No. 215,254
3 Claims. (Cl. 324—63)

The present invention relates to a device for permitting rapid sequential calibration of a number of transducers possessing generally similar response characteristics. In particular, the invention relates to means for calibrating in the field components specifically designed to measure slight changes in their environment, as for example a change in the acceleration of a mechanism of which they form a part, a variation in the pressure applied thereto, or some modification in the physical position or orientation of the component in which they are incorporated.

Many types of instruments are available to measure an increase or decrease in the magnitude of some environmental factor or condition. These instruments are usually designed to develop an electrical output variation in response to a corresponding variation in an applied force or pressure. One instance in which such an instrument may be utilized with advantage is in the recordation of strains induced in a member subject to an external stimulus. However, as the description progresses, it will become apparent that the invention is also useful in calibrating instruments intended to measure many other conditions such as temperature, humidity, electrical resistance, etc. By way of further example, certain force-measuring devices, frequently termed strain gauges, find numerous applications in the testing and evaluation of guided missiles, where it is of extreme importance to have knowledge of the performance and/or reliability of many components of the missile both during launching and throughout its subsequent flight.

Although transducers of the type under consideration are at the present time manufactured within relatively close tolerances, nonetheless their actual operating characteristics may vary slightly at the time of operation due to such factors as age, exposure to the weather, shocks received during transportation, etc. It is therefore extremely important to have a thorough knowledge of the response of a particular transducer immediately prior to the time when the latter is to be actually utilized. Heretofore, this calibrating has been accomplished by means of rather complicated test instruments, usually of the straight potentiometer type, which yield incremental data. This data, obtained in response to known changes in the stimulus applied to the transducer, requires further mental calculation or computation to yield a representation of the overall response curve of the element being tested. Such techniques not only require considerable time, but necessitate the employment of complicated apparatus which often is difficult or impossible to transport to the location where the measurements are to be taken.

In accordance with a preferred embodiment of the present invention, means are provided whereby a series of devices to be calibrated (such for example as pressure-responsive strain gauges) may be readily and quickly calibrated in sequence by utilizing information obtained during each particular measuring operation so as to point out any variation which may be indicative of a departure of the device last measured from a standard or optimum response condition. Furthermore, the apparatus herein set forth is designed to yield information respecting not only the linearity characteristics of the transducer being investigated, but also the sensitivity of such component to variations in an applied stimulus. As a result, procedures formerly carried out to ensure accuracy of environmental-responsive electrical circuit elements are greatly simplified, and the quality or accuracy of such units may be ascertained by direct manipulation of the disclosed apparatus without the necessity of plotting data representative of the response of the transducer to incrementally-applied changes in its environment.

One object of the present invention, therefore, is to provide improved apparatus for calibrating components responsive to changes in some characteristic of their environment.

A further object of the invention is to provide apparatus specifically designed to calibrate transducers responsive to the application of a force or pressure thereto.

An additional object of the invention is to provide means particularly designed to receive a series of transducers for successive calibration thereof, such means incorporating apparatus for storing or retaining information during successive testing operations to thereby yield an output representative of any deviation of a particular element being tested from the level or value established by such stored or retained information.

A still further object of the invention is to provide a calibrating device which is capable of measuring several different characteristics of an electrical circuit component without the necessity of employing mental calculations or the reconstruction of incremental data into an overall response presentation.

Other objects and many of the attendant advantages of this invention will be readily appreciated as the same becomes better understood by reference to the following detailed description when considered in connection with the accompanying drawings wherein:

FIG. 1 is a schematic showing of a circuit designed in accordance with a preferred embodiment of the present invention, and by means of which a condition-responsive circuit element may be calibrated with respect to its linearity characteristic; and FIG. 2 is a circuit designed somewhat along the lines of the circuit of FIG. 1, but specifically arranged to calibrate a condition-responsive circuit component with respect to its sensitivity.

Referring initially to FIG. 1 of the drawings, there is illustrated a condition-responsive device certain response characteristics of which are to be determined with respect to a standard or optimum value. For example, if this condition-responsive device is in the form of a transducer (designated by the reference numeral 10) then one characteristic thereof to be determined would constitute its linearity of response to an applied stimulus. Another characteristic, its sensitivity within a predetermined range to changes in such stimulus, is determined by the circuit of FIG. 2 in a manner to be set forth hereinafter.

Accordingly, it will be assumed that the component to be calibrated comprises the transducer 10, which may be a strain gauge having four arms arranged in the form of a balanced bridge. These four arms may comprise conventional resistance elements 12, 14, 16 and 18 which, in practice, may be of the bonded-wire type disposed in quadrature on or within a member to which a stress is to be applied. It is assumed that this member is capable of distortion, or possesses elasticity the amount of which is a function of the applied load. Frequently, such a member is an elongated bar or rod of some metal such as heat-treated tool steel. The use of strain gauges arranged in the form of a Wheatstone bridge is conventional for obtaining such measurements.

The four strain gauges resistance elements 12, 14, 16 and 18 of FIGS. 1 and 2 are inter-related in a manner similar to that set forth above. It will be apparent that in order to obtain accurate measurements from such a device in the face of relatively slight changes in stress applied to the structure on which the strain gauge is mounted, the accuracy, or precision of response, of the transducer must be very high if the results are to be of value. Even additive manufacturing tolerances, or subsequent changes in the transducer's output vs. input curve, can render the data obtained extremely misleading if not completely erroneous. Consequently, in any application, it becomes desirable to calibrate each transducer just prior to it being used for the purpose for which it is designed.

Heretofore, as above stated, such calibrating was done by varying the applied stimulus and compiling data as to the transducers response to these changes, the compiled data then being manually correlated. In accordance with the present invention, a circuit such as shown in FIG. 1 may be employed to determine the linearity response of the transducer 10 directly, and, furthermore, to compare such response with that obtained from other transducers calibrated either immediately prior to that time or subsequent to the particular test being carried out.

To facilitate the interconnection of the component to be calibrated into the test circuit of FIG. 1, this component (such as the transducer unit 10) is constructed in modular form and incorporates a plurality of outwardly-projecting prongs 20. These prongs 20 are respectively receivable in sockets 22 arranged to mate therewith, the sockets 22 being electrically interconnected into the calibration circuit. For convenience of illustration, the prongs 20 and sockets 22 are diagrammatically shown in the drawing, since they may be of conventional design, and are utilized merely to facilitate the insertion or removal of a particular transducer 10 into the linearity (or sensitivity) calibration circuit with which it is selectively associated.

As shown in FIG. 1, a so-called "calibration shunt selector" network 24 is connected directly across the resistance element 12 of transducer 10. This shunt network 24 comprises three impedances $R_1$, $R_2$, $R_3$, arranged in parallel relationship and designed for selective electrical shunting across the resistance element 12 upon manual actuation of a switch 26. Purely by way of example, the impedances $R_1$, $R_2$, $R_3$, may have resistance values of 10K, 40K and 160K, respectively, although, other values may be employed if desired and further parallel impedances utilized if the latter should prove either desirable or necessary.

It has been stated above that the circuit of FIG. 1 is provided for the purpose of calibrating the transducer 10 with respect to its linearity of response. To achieve this objective, the transducer 10 has applied thereto a potential from a source 28, the latter having its positive terminal connected to a point A (on the transducer bridge between the resistance elements 12 and 14) and its negative terminal connected to a point B on the transducer bridge (between the resistance elements 16 and 18). The two remaining junction points on the bridge network lie between the resistance elements 12 and 16 (designated by the reference character C) and the point between the resistance elements 14 and 18 (designated by the reference character D). The linearity of response of transducers, as is known in the art, is measured by the voltage differential developed between points C and D while the system of which the transducer forms a part is in operation.

As further shown in FIG. 1, a balancing potentiometer 30 has its resistance element connected directly across the potential source 28, the movable contact of this potentiometer 30 being electrically joined through a resistor 32 to junction point D on the transducer bridge, as shown. Two further resistors 34 and 36 are connected in series between the junction points A and B, this series combination lying in parallel both with the balancing potentiometer 30 and the source of energy 28. For reasons which will later become apparent, these additional resistors 34 and 36 are employed primarily as an aid in obtaining a calibration of transducer 10 for its sensitivity, and their operation will be described in connection with FIG. 2 of the drawings. However, they are shown as a part of the circuit of FIG. 1 since it is intended that the two circuits of FIGS. 1 and 2 be selectively utilizable by the mere manipulation of a single switch (not shown) to allow either linearity or sensitivity calibration to be made of a particular transducer without disengaging the prongs 20 from sockets 22 and without disengaging any of the remaining circuit components. It is believed that a comparison of the circuits of FIGS. 1 and 2 will immediately make clear their interchangeability to any person skilled in the art to which this invention relates.

The series-connected resistors 34 and 36 have no effect upon the linearity calibration performed by the circuit of FIG. 1, since they merely act as to establish a voltage divider network in parallel with the transducer 10 and the potentiometer 30. As will subsequently be seen, for the purpose of linearity calibration, voltage differentials between the points C and D are the only ones of concern.

The linearity measuring network of FIG. 1 comprises a source of potential 38, an adjustable resistor 40, and a so-called linearity adjustment potentiometer 42. All of the elements 38, 40 and 42 are connected in series, so that current flows therethrough the amount of which is determined by manual adjustment of resistor 40. As shown in the drawing, the junction point 44 between elements 40 and 42 is connected to point D on the transducer bridge. Point C on the transducer bridge is electrically connected through a galvanometer 46 to the movable contact 48 of potentiometer 42. The battery 38 is so polarized that the positive terminal thereof is connected to the adjustable resistor 40, as shown. The purpose for such a connection will now be brought out.

In initially arranging the circuit of FIG. 1 for operation, a transducer of known characteristics is employed so that the various component values may be determined for optimum results. Consequently, such a standardized or reference transducer is incorporated into the circuit by an insertion of the various prongs 20 into their respective sockets 22. It is assumed that during this initial setting up of the circuit of FIG. 1, the switch 26 of the calibration shunt selector network 24 is open, and that the movable contact 48 of the potentiometer 42 is moved to the extreme right (in the drawing) so that the two junction points C and D of the transducer bridge are interconnected thru the galvanometer 46. Under such conditions, and with a perfect balance existing between the various arms of the bridge network 10, the pointer or needle of the galvanometer 46 will register zero. That is, the potential at points C and D of the transducer bridge will be equal, and no current will flow through the galvanometer. The potentiometer 30 is provided so that should such exactly equal conditions not exist, movement of the potentiometer contact will vary the potential at point D until such potential is exactly equalized to that at point C.

It has been stated above that the components 38, 40 and 42 are series connected as shown in the drawing. The adjustable resistor 40 thus acts as a control to regulate the amount of current flowing through the winding of potentiometer 42 and hence determines the voltage drop thereacross. Assuming that, as in the present instance, the potentiometer 42 is intended to yield a reading representing the departure of transducer 10 from a condition of linearity, then it will be appreciated that a manual adjustment of resistor 40 will bring about a change in the total IR drop across the winding of potentiometer 42, and this IR drop represents the range from 0% to 100% over which a linearity reading may be obtained.

When the components are set up as above described and the potentiometers 30 and 42 adjusted for exact balance (a zero reading on galvanometer 46) the switch 26 of network 24 is operated so as to effectively shunt the resistance element 12 of the transducer bridge with one of the impedances such, for example, as $R_1$. The effect of this action is to unbalance the bridge network and cause the galvanometer 46 to read other than zero. A manual adjustment of the movable contact 48 to the left (in the drawing) then can bring the galvanometer pointer back to zero, since the movable contact 48 will eventually engage a point on the winding of potentiometer 42 which has a potential value equal to that appearing at point C of the transducer bridge. This potentiometer setting is then noted by the operator of the calibrating apparatus.

The switch 26 is then manipulated to bring the impedance $R_2$ into shunt with the resistance element 12 of the bridge, and the same procedure is repeated. As many additional impedances (such as $R_3$, etc.) are thus brought into the circuit as may be desirable or necessary for a complete linearity test of the transducer, and the various settings of control 48 made of record.

When the above operation has been completed, the transducer 10 is removed from the circuit of FIG. 1 by disconnecting the pin contacts 20 from their respective sockets 22, and the transducer is replaced by a further transducer of unknown response characteristics. Switch 26 is opened, movable contact 48 of potentiometer 42 moved to the right on 0% position, and a reading taken for galvanometer 46. If the transducer now being tested is accurate or possesses characteristics identical to the original standardized or reference transducer, galvanometer 46 will read zero at this initial test position since the correct adjustment of resistor 40 has already been made. However, should such not be the case, it will be necessary to move the contact 48 to the left, and the amount by which this contact must be moved will designate the amount by which the particular transducer being tested departs from linearity for the condition being simulated. The calibration shunt selector switch 26 is now moved through its various positions to successively bring the impedances $R_1$, $R_2$, $R_3$, etc. into parallel electrical relationship with the resistance element 12 of the bridge network, and readings are taken of the various points at which the movable contact 48 of potentiometer 42 must be positioned in order to bring about respective zero readings of galvanometer 46. These points, when compared to the points originally derived during testing of the reference transducer yield (when interconnected) a curve which may readily be compared to the curve representing the linearity characteristic of the reference transducer. As many transducers as desired can be sequentially calibrated for linearity in this manner, and the various curves obtained by interconnecting the data points obtained then superimposed upon one another to provide a ready comparison between the various strain gauges or other components to determine their suitability for actual utilization in operating equipment.

The linearity calibration obtained by the apparatus of FIG. 1 may readily be supplemented by sensitivity information obtained by the addition to the circuit of FIG. 1 of the relatively few extra components shown in FIG. 2. When the latter arrangement is employed, the network including the elements 38, 40 and 42 may be eliminated, and a further network utilized which includes a source of potential 50, an adjustable resistor 52, and an impedance 54 series-connected in the manner illustrated. The junction point 56 between the adjustable resistor 52 and the impedance 54 is connected through a galvanometer 58 (which may be identified with the galvanometer 46 of FIG. 1) to a movable contact 60 forming a part of potentiometer 62. For simplification of illustration, the winding of potentiometer 62 has been illustrated as the resistance element 36 in the circuit of FIG. 1, to which reference is made. Likewise, a further adjustable resistor is included in the circuit of FIG. 2, this adjustable resistor being present in the circuit of FIG. 1 and being designated by the reference numeral 34. The remaining components of FIG. 2 given the same reference numerals by which they were designated in FIG. 1 for convenience of description. It should be understood at this point that although the respective circuits of FIGS. 1 and 2 are illustrated separately in order ot facilitate an understanding of the separate measurements obtainable respecting the linearity or sensitivity characteristics of a particular transducer, nevertheless in actual operation the respective circuits of FIGS. 1 and 2 will be intergrated into a single unitary instrument with provisions for sequentially obtaining calibrations representing both the linearity and sensitivity characteristics of a particular transducer while it is present in the instrument and before removing the component for calibration of a different transducer. Expressed differently, measurements obtainable by the apparatus of both FIGS. 1 and 2 are carried out while the pins 20 of a particular transducer are inserted in their respective sockets 22 and before calibration of another transducer is initiated.

With the above in mind, and again referring to FIG. 2, it will be appreciated that, contrary to FIG. 1 where the linearity characteristic of a transducer 10 is calibrated by taking measurements between junction points C and D of the transducer bridge, the sensitivity of response of the transducer is determined by utilizing voltage changes occurring between transducer bridge points A and B. Consequently, the adjustable resistor 34 and the winding of potentiometer 62 are series-connected across these points A and B, and also across the potential source 28, as illustrated. A variation in the adjustment of resistor 34 then varies the current flowing through the winding of potentiometer 62, and as a result changes the IR drop thereacross somewhat in the manner in which the linearity network of FIG. 1 operates. The resistor 34 thus acts as a sensitivity range control to determine the range between 0% and 100% over which the movable contact 60 of potentiometer 62 is movable to yield a sensitivity calibration of the particular transducer 10 which may at any time be under test. With a standard or reference transducer employed initially, the movable contact 60 at its highest position (in the drawing), and with the switch 26 in open position, the resistor 52 is adjusted to bring the voltage at point 56 to the same value as the voltage appearing at the movable contact 60. Consequently, no current flows through the galvanometer 58 and the pointer of the galvanometer will read zero. Manipulation of switch 26 to bring successive impedances $R_1$, $R_2$, $R_3$, etc. into shunt with resistance element 12 will necessitate manipulation of the movable contact 60 to successive points on the winding 62 in order to obtain zero indications on the galvanometer. The potentiometer settings are recorded and utilized as a standard against which successive transducers are to be measured for sensitivity. As in the case of FIG. 1, any departure from these calibration standards when successive transducers are being evaluated indicates whether or not such transducers are suitable for utilization, depending upon the extent of such departures and the amount which can be tolerated in the particular application where the transducers are to be employed.

It will be recognized that the adjustable impedance 34 in FIG. 2 is effective to set the sensitivity range over which the potentiometer 62 is operable, this range being designated in millivolts/volt. For effective calibration, this impedance 34 should have a circuit value determined in accordance with the design of the transducer 10 being calibrated. If the transducers in question are more or less conventional strain gauges, then the element 34 may have a total value, for example, of 100K. Other representative values for the respective elements of FIGS. 1 and 2 are as follows, these values having proven to be satisfactory in actual operation:

Resistor 32=50K
Resistor 40=50K
Resistor 52=50K
Resistor 54=1K
Potentiometer 30=5K
Potentiometer 42=1K
Potentiometer 62=1K Resistor 34=10K for 100 mv./v., or 100K for 10 mv./v.

Obviously many modifications and variations of the present invention are possible in the light of the above teachings. It is therefore to be understood that within the scope of the appended claims the invention may be practiced otherwise than as specifically described.

I claim:

1. Apparatus for calibrating a condition-responsive circuit component with respect to its sensitivity of response to changes in a condition, said circuit component being made up of four electrical resistance elements arranged in the form of a balanced bridge, said apparatus comprising a source of operating potential connected across two oppositely-disposed junction points on said bridge, an adjustable range-setting resistor, a potentiometer, means connecting said range-setting resistor and the resistance portion of said potentiometer in series with one another, means connecting the assembly formed by said range-setting resistor and the resistance portion of said potentiometer across the two said oppositely-disposed junction points on said bridge in parallel with said source of potential, and a sensitivity-calibrating network comprising a further source of potential, a manually-adjustable current-control resistor, and a fixed impedance, all of the mentioned members of said network being connected in series to form a closed loop, a further connection between a point intermediate said further source of potential and said fixed impedance to one of the said two oppositely-disposed junction points on said bridge, a voltage-measuring device, and a connection from the movable contact of said potentiometer through said voltage-measuring device to a point on said sensitivity-calibrating network intermediate said fixed impedance and said manually-adjustable current-control resistor.

2. Apparatus according to claim 1 in which said voltage-measuring device comprises a galvanometer calibrated to read zero when the movable contact of said potentiometer is positioned so that the potential at such contact is equal to the potential at the point on said sensitivity-calibrating network intermediate said fixed impedance and said manually-adjustable current-control resistor.

3. Apparatus according to claim 2, further comprising a calibration shunt selector network connected in parallel electrical relation with one of the four electrical resistance elements making up said bridge, said calibration shunt selector network comprising a plurality of impedance of different electrical values, and a manually operable switch for selectively connecting one of said impedances into parallel electrical relationship with the particular resistance element of said bridge with which said calibration shunt selector network is associated.

References Cited by the Examiner

UNITED STATES PATENTS

| | | | |
|---|---|---|---|
| 1,090,419 | 3/14 | Sprong | 324—130 |
| 2,030,956 | 2/36 | Barker. | |
| 2,166,935 | 7/39 | Adams | 324—63 X |
| 2,911,588 | 11/59 | Wetherhold | 324—34 |
| 3,098,194 | 7/63 | Clemens | 323—66 |

WALTER L. CARLSON, *Primary Examiner.*